Sept. 15, 1959 S. A. SCHERBATSKOY 2,904,629
SCANNING METHOD
Filed April 28, 1952
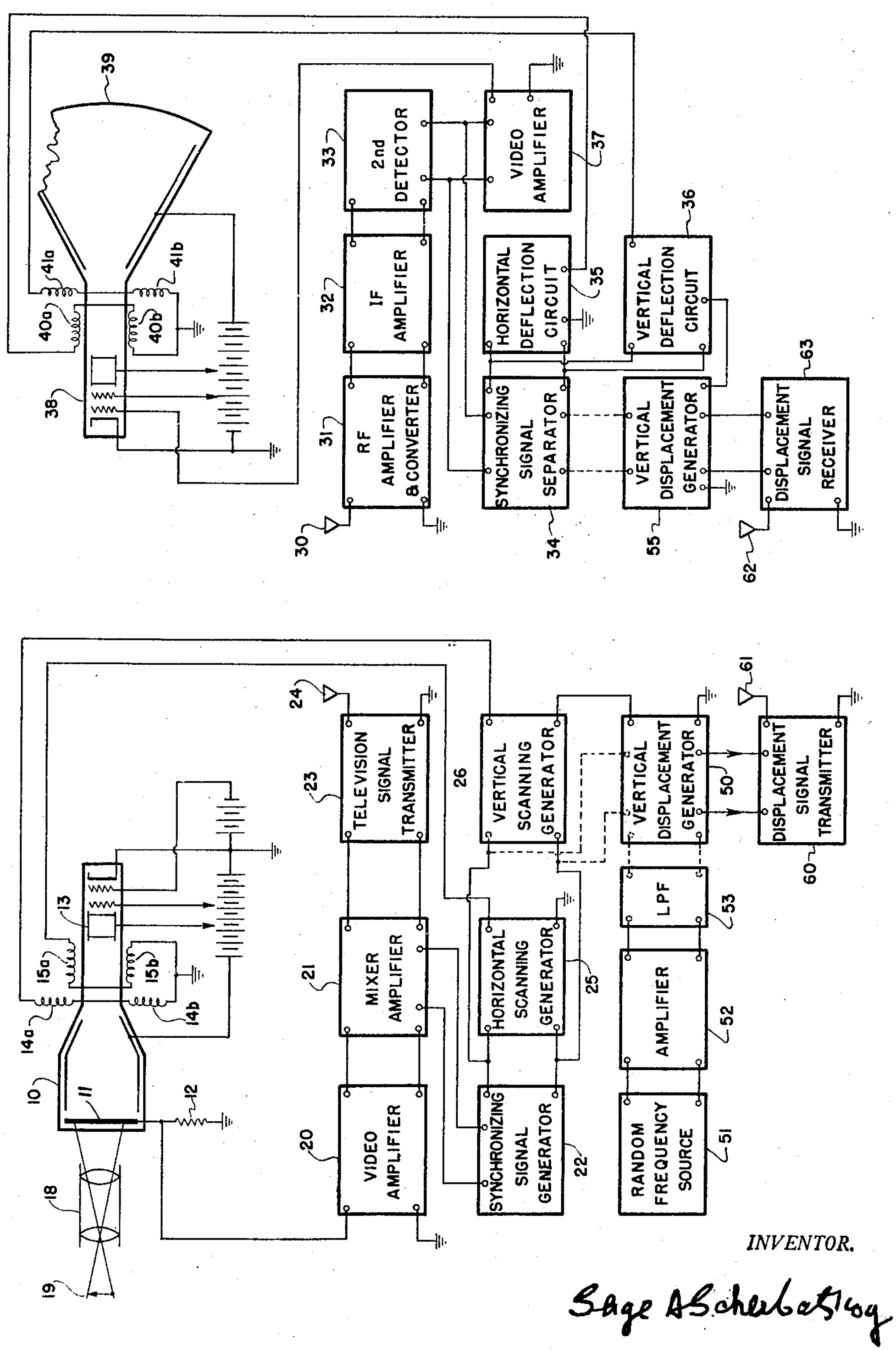
INVENTOR.
Sage A Scherbatskoy 2,904,629
Patented Sept. 15, 1959

1

2,904,629

SCANNING METHOD

Serge A. Scherbatskoy, Tulsa, Okla.

Application April 28, 1952, Serial No. 284,677
2 Claims. (Cl. 178—6.8)

The present invention relates to television transmitting and receiving systems and more particularly to a system for reducing the horizontal line structure in the image which is reproduced at the television receiver.

Under present television standards the image to be transmitted is scanned in a series of fields of parallel lines and the image is reproduced by means of a cathode ray tube at the television receiver by deflecting the electrode beam of the cathode ray tube in exact synchronism with the scanning means at the transmitter so as to set up a corresponding series of fields of parallel lines. With this arrangement both the image at the transmitter and the cathode ray tube screen at the receiver are continuously scanned along the same horizontal lines so as to produce pronounced bright lines in the television picture. The field of lines so produced is called a "raster" and is sometimes referred to as the horizontal line structure of the reproduced image. The present television standards call for a field of 525 horizontal lines and with a normal spot size for small cathode ray tubes the horizontal line structure is not too objectionable since the horizontal lines are almost contiguous. However, as the size of the television screen is increased, the distance between the horizontal scanning lines also increases and in large screen television receivers the horizontal line structure is very definite and pronounced and is very objectionable if the viewer is close to the screen. The present trend is to large screen television. In fact, the smallest cathode ray tube of one manufacturer's line of television receivers has a diameter of 17 inches. Accordingly, it would be very desirable to provide an arrangement wherein the bright horizontal scanning lines, i.e., the horizontal line structure in the reproduced image, is substantially reduced, and it is a primary object of this invention to provide an arrangement of this type.

It is another object of the present invention to provide a system for reducing horizontal line structure in television receiver images wherein the scanning fields are displaced in one direction at either a periodic or random rate to prevent continual scanning of the image area along the same horizontal lines.

It is a further object of the present invention to provide a new and improved system for reducing horizontal line structure in television receiver images whereby the contrast of the picture is increased and the appearance of the picture is greatly enhanced.

Briefly, in accordance with one aspect of the present invention, there is provided at the television transmitting station a video signal generator having an image area to which is presented an image to be transmitted together with scanning means for scanning the image area in a series of fields of parallel lines. Connected in series with the conventional vertical scanning generator there is provided a vertical displacement means controlled either by a random frequency signal generator or a signal generator of predetermined frequency for displacing the scanning fields in a vertical direction to

2 prevent continual scanning of the image area along the same lines. The composite television signal thus produced is transmitted by conventional means to the television receivers within the telecasting area and the television receiver is provided with image reproducting means, such as a cathode ray tube, and means operated in synchronism with the synchronizing signal components of the transmitted composite television signal for deflecting the electron beam of the cathode ray tube in two directions perpendicular to each other to reconstruct the transmitted image. In the receiver there is also provided means controlled in synchronism with the field displacement means of the transmitter for varying the electron beam in the vertical direction in direct proportion to the scanning field displacement. With this arrangement a small up-and-down displacement of the scanning pattern is produced so that successive images are reproduced by scanning patterns that are not identical. The horizontal line structure, which is visible on the screen of the conventional receiver, then disappears because the successive sweeps of the electron beam are not in exactly the same horizontal line position. Also, because the same shift is introduced in synchronism at the transmitter and receiver, no distortion of the image occurs.

The invention, both as to its organization and method of operation, together with further objects and advantages thereof, will best be understood by reference to the following specification taken in connection with the accompanying drawing, in which:

The single figure of the drawing discloses in block diagram form a television transmitting and receiving system embodying the principles of the present invention.

Referring now more particularly to the drawing, the transmitter portion of the system of the present invention is shown in the left-hand half of the drawing, and a typical receiving station is shown in the right-hand half of this figure. Referring first to the transmitter portion of the system, there is provided a suitable video frequency signal generator 10, which may be of any well known design and construction. For example, in the illustrated embodiment the generator 10 is of the low velocity image storing type commonly known as an "orthicon" type of video signal generator. The generator 10 comprises a suitable electron gun arrangement for producing an electron beam and focusing the beam of low velocity electrons on the target electrode 11 which is of the mosaic or cellular type and is enclosed within the evacuated envelope of the generator 10. A load resistor 12 is connected between the target 11 and ground and video frequency signals are developed across the load resistor 12 in response to the scanning of the target by the electron beam under the control of the beam deflecting elements. More specifically, the electron beam issuing from the gun structure 13 is deflected in the vertical direction by means of the vertical deflecting coils 14_a_ and 14_b_ and the beam is deflected in the horizontal direction by means of the horizontal deflecting coils 15_a_ and 15_b_, all of these coils being positioned about the neck of the cathode ray tube in a conventional manner so as to produce efficient deflection of the electron beam.

An optical system indicated generally at 18 is employed to focus the object indicated as the arrow 19 upon the surface of the target 11. As the electron beam sweeps across the target 11, the storage cells of the mosaic-like target 11 are successively discharged to produce currents through the load resistor 12 in proportion to the amount of charge acquired by each cell and hence in accordance with the light intensity of this particular area of the image. The video signals thus produced across the resistor 12 are coupled to a video amplifier 20, which may be of any suitable design, and is adapted to amplify the video frequency components of the television signal without distortion, and the output from the video amplifier 20 is coupled to a mixer amplifier 21. A synchronizing signal generator 22 is provided to establish the conventional horizontal and vertical synchronizing signals and these synchronizing signals are also connected to the mixer amplifier 21 so as to produce in the output of this amplifier a composite television signal consisting of the synchronizing signals which are superimposed upon the video signal during the synchronizing intervals of the signal.

The composite television signal which is produced in the output circuit of the mixer amplifier 21 is coupled to a transmitter 23 wherein the composite television signal is modulated upon a suitable high frequency carrier, either by amplitude, phase, or frequency modulation and the modulated carrier wave is coupled to the transmitter antenna system 24 for broadcast to the service area of the television transmitter station.

In order to produce scanning currents in the deflection coils 14*a*, 14*b*, 15*a*, and 15*b*, there is provided a horizontal scanning generator 25 and a vertical scanning generator 26 which are operated in synchronism with the synchronizing signal generator 22. More specifically, the horizontal signal generator 25 is controlled by the horizontal synchronizing signals developed by the generator 22 and produces a saw-tooth scanning wave which is impressed upon the horizontal deflection coils 15*a* and 15*b* so as to deflect the electron beam in the horizontal direction. In a similar manner the vertical scanning generator 26 is controlled by the vertical synchronizing components of the synchronizing signal developed by the generator 22 and produces a saw-tooth wave at the vertical scanning rate which is impressed upon the vertical deflection coils 14*a* and 14*b*.

The modulated carrier wave broadcast by the antenna system 24 is picked up by the receiver antenna system 30 and supplied to an R.F. amplifier and converter stage 31 in a television receiver located at a remote receiving point. The converter 31 operates to convert the received radio frequency signals into corresponding intermediate frequency signals which are amplified in the amplifier 32 and coupled to the second detector 33. In the second detector 33 the composite television signal is detected and the synchronizing signal components are supplied to a synchronizing signal separator 34 wherein the vertical and horizontal synchronizing signals are separated and supplied respectively to the horizontal deflection circuit 35 and the vertical deflection circuit 36. The composite video signal is also supplied from the second detector 33 to the video amplifier 37 wherein these signals are amplified to a suitable level and supplied to the control grid of a cathode ray tube indicated generally at 38. The cathode ray tube 38 is provided with a suitable beam-forming gun structure so as to produce an electron beam which strikes the end wall 39 of the cathode ray tube 38 and fluoresces so as to reproduce the familiar television image. The horizontal deflection circuit 35 produces a saw-tooth scanning wave at the horizontal frequency which is supplied to the horizontal deflection coils 40*a* and 40*b*, and the vertical deflection circuit 36 develops a saw-tooth wave at the vertical scanning frequency which is supplied to the vertical deflection coils 41*a* and 41*b*. Accordingly, the electron beam of the cathode ray tube 38 is deflected in two directions perpendicular to each other to scan a rectilinear field and thereby reconstruct the transmitted image on the screen 39.

All of the above enumerated components may be of conventional well known construction, and accordingly a detailed description thereof is considered unnecessary herein. It will also be understood that any conventional modification of any of the above-enumerated components may be made as desired without influencing in any way the operation of the system of the present invention.

In order to reduce the horizontal line structure of the reproduced image produced on the end wall 39 of the receiver cathode ray tube 38, there is provided at the transmitter station a vertical displacement generator 50. The generator 50 may comprise either a free running oscillator or a driven oscillator operating at a certain predetermined frequency as described in more detail hereinafter, and the output of the vertical displacement generator is connected in series with the output circuit of the vertical scanning generator 26 so that the sum of the outputs of the two generators 26 and 50 comprises the total vertical deflection of the electron beam of the video signal generator 10. The output circuits of the generators 26 and 50 may be combined in any suitable manner. For example, the vertical scanning generator 26 may be provided with an output transformer having an ungrounded secondary which is connected in series with the secondary of the output transformer in the vertical displacement generator 50, the combined voltages produced across these secondary windings being impressed upon the deflection coils 14*a* and 14*b*. The magnitude of the output current developed by the vertical displacement generator 50 is relatively small as compared to the output of the vertical scanning generator 26 so that the scanning field of the generator 10 is subject to a small up and down displacement at a frequency determined by the frequency of the vertical displacement generator 50.

The vertical displacement generator 50 may either be operated at a relatively low frequency as compared to the vertical scanning rate or at a relatively high frequency as compared to the horizontal deflection rate, and these frequencies may either be synchronous or non-synchronous with the corresponding scanning frequencies. The wave shape of the output signal developed by the vertical displacement generator 50 may comprise either a sinusoidal wave, a saw-tooth wave, or a square wave. Also, the vertical displacement generator 50 may be operated as a driven oscillator by connecting the output of the synchronizing signal generator 22 to the input of the vertical displacement generator 50. In this manner the vertical synchronizing signals, which conventionally recur at the rate of 60 cycles per second, are employed to synchronize the vertical displacement generator which may be operated at a frequency of from 5 to 35 cycles per second. Preferably, the frequency of the vertical displacement generator is sufficiently high to prevent flickering of the reproduced image while being sufficiently low to permit a shift in the scanning field during the vertical retrace intervals. In this connection it will be understood that if a square wave type of vertical displacement is provided by the generator 50, the abrupt change which occurs at the leading and trailing edges of the square wave is preferably synchronized so as to recur during the vertical retrace intervals of the signals developed by the synchronizing generator 22 and under these conditions the vertical displacement generator 50 will be synchronized from the generator 22.

The vertical displacement generator 50 may also be operated at a strictly random rate. Thus, in accordance with one embodiment of the invention a random frequency source 51, which may comprise any suitable noise generator or other device having a random frequency output, is coupled to the amplifier 52 wherein the random frequency signal is amplified and passed through the low pass filter 53 after which it is used to control the frequency or trigger rate of the vertical displacement generator. In this connection it will be understood that the vertical displacement generator may comprise any suitable type of oscillator which may be triggered from the random frequency signal passed by the low pass filter 53. In this connection it will be understood that strictly random distribution is not absolutely necessary so long as the period between exact repetitions of the vertical displacement signal is relatively long as compared to the corresponding scanning rate.

In order to produce a corresponding vertical displacement of the reproduced image at the television receiver station, there is provided in the television receiver a vertical displacement generator 55. The vertical displacement generator 55 may be similar to the vertical displacement generator 50 at the television transmitter and is provided with an output circuit which is connected in series with the output circuit of the vertical deflection circuit 36. Accordingly, the output of the vertical displacement generator 55 is added to the output of the vertical scanning wave provided by the vertical deflection circuit 36 so that the sum of these two waves is impressed upon the vertical deflection coils **41*a* and 41*b*** and deflects the electron beam accordingly.

The vertical displacement generator 50 at the transmitter and the vertical displacement generator 55 at the receiver may be synchronized by any suitable means. For example, in the illustrated embodiment a separate displacement signal transmitter 60 is provided to which is supplied a portion of the output wave of the vertical displacement generator 50. This vertical displacement signal is modulated upon a suitable radio frequency carrier and is transmitted from the transmitter antenna system 61 to the receiver antenna system 62, which latter element is coupled to a displacement signal receiver 63 at the receiver station. The receiver 63 is provided with a suitable radio frequency amplifier channel and a suitable detector stage so that the vertical displacement signal is reproduced in the output circuit of the receiver 63 and is impressed upon the vertical displacement generator 55 to control the frequency of operation thereof. In this connection it will be understood that other suitable means of synchronizing the vertical displacement generators 50 and 55 may be employed. For example, the output of the vertical displacement generator 50 may be modulated upon the main carrier wave developed by the television signal transmitter 23 in either a sub-multiplex arrangement or other suitable double modulation system. In the alternative, a direct wire synchronization between the vertical displacement generators 50 and 55 may be effected in situations where the transmitter and receiver are relatively close together. Also, a common alternating current power supply which interconnects the transmitter and receiver may be employed to effect synchronization of the generators 50 and 55 in a manner well known to those skilled in the art.

From the foregoing description it will be understood that the present invention provides a relatively simple and efficient system for substantially eliminating the line structure now present in television receiver images. By introducing a small vertical displacement of the scanning field at the transmitter so that successive images are reproduced by scanning patterns that are not identical, and by providing a corresponding shift in the reproduced image at the receiver, horizontal lines in the reproduced image are not readily apparent and no distortion of the image occurs.

While there has been described what is at present considered to be the preferred embodiment of the invention, it will be understood that various modifications may be made therein which are within the true spirit and scope of the invention as defined in the appended claims.

What is claimed as new and desired to be secured by Letters Patent of the United States is:

1. In a television system wherein an image is scanned to form a video signal which is transmitted to a receiving point and there reconstructed into a visual image, the method of image scanning which comprises the steps of developing at the transmitter a main scanning signal of predetermined frequency and substantially sawtooth configuration when plotted as a function of time, generating a noise signal characterized by random frequency components, adding the main scanning signal and the noise signal together to produce a resultant signal, using the resultant signal to effect image scanning at the transmitter, transmitting to the receiving point suitable synchronizing pulses to permit reproduction at the receiving point of a counterpart of the main scanning signal, transmitting to the receiving point said noise signal, adding the received noise signal to the reproduced counterpart of said main scanning signal at the receiving point to produce a reconstructed resultant signal, and using the resultant signal to effect scanning in the reproduction of the transmitted image.

2. The method of claim 1 which comprises the step of adjusting the ratio of amplitudes of the main signal and the noise signal to produce maximum scanning-beam displacement due to the noise signal approximately equal to the normal displacement between successive scans produced by the main scanning signal.

References Cited in the file of this patent

UNITED STATES PATENTS

| | | |
|---|---|---|
| 2,112,684 | Von Ardenne | Mar. 29, 1938 |
| 2,222,934 | Blumlein | Nov. 26, 1940 |
| 2,251,525 | Rosenthal | Aug. 5, 1941 |
| 2,402,067 | Mathes | June 11, 1946 |
| 2,472,774 | Mayle | June 7, 1949 |
| 2,570,188 | Aram | Oct. 9, 1951 |
| 2,681,383 | Loe | June 15, 1954 |